United States Patent
McLaughlin et al.

(10) Patent No.: US 6,502,208 B1
(45) Date of Patent: Dec. 31, 2002

(54) METHOD AND SYSTEM FOR CHECK STOP ERROR HANDLING

(75) Inventors: Charles Andrew McLaughlin, Round Rock, TX (US); Alongkorn Kitamorn, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 844 days.

(21) Appl. No.: 08/829,017

(22) Filed: Mar. 31, 1997

(51) Int. Cl.[7] .......................... H02H 3/05; H03K 19/003
(52) U.S. Cl. ............................ 714/25; 714/36; 714/38; 714/39
(58) Field of Search .................. 395/183.01, 183.12, 395/183.14, 183.15, 183.17, 183.2, 184.01, 185.02, 185.01, 185.05; 714/25, 36, 38, 39, 41, 44, 47, 49, 48, 52

(56) References Cited

U.S. PATENT DOCUMENTS

| | | | |
|---|---|---|---|
| 4,044,337 A | 8/1977 | Hicks et al. | 364/200 |
| 4,095,268 A | 6/1978 | Kobayashi et al. | 364/200 |
| 4,215,397 A | 7/1980 | Hom | 364/101 |
| 4,360,917 A | 11/1982 | Sindelar et al. | 371/49 |
| 4,511,982 A | 4/1985 | Kurakake | 364/167 |
| 4,604,746 A | 8/1986 | Blum | 371/25 |
| 4,965,717 A | 10/1990 | Cutts, Jr. et al. | 364/200 |
| 5,142,165 A | 8/1992 | Allard et al. | 307/130 |
| 5,193,181 A | 3/1993 | Barlow et al. | 395/575 |
| 5,245,615 A | 9/1993 | Treu | 371/16.5 |
| 5,249,187 A | 9/1993 | Bruckert et al. | 371/68.1 |
| 5,251,227 A | 10/1993 | Bruckert et al. | 371/12 |
| 5,267,246 A | 11/1993 | Huang et al. | 371/165 |
| 5,291,600 A | 3/1994 | Lutz et al. | 395/700 |

(List continued on next page.)

FOREIGN PATENT DOCUMENTS

| | | | | |
|---|---|---|---|---|
| EP | WO9700480 | 1/1997 | ........... | G06F/13/14 |
| EP | 811929 A2 | 12/1997 | ........... | G06F/13/40 |
| JP | 556672 A | 1/1980 | | |
| JP | 6334492 | 7/1988 | | |
| JP | 3179538 | 8/1991 | | |
| JP | 63255742 | 10/1998 | | |

OTHER PUBLICATIONS

IBM Technical Disclosure Bulletin, vol. 36, No. 8, Aug. 1993, pp. 607–612.
"Chapter 10: Error Detection and Handling", PCI System Architecture, 189–207.
IBM Technical Disclosure Bulletin, "Programmed Clock Synchronization In A Skewed Clock Enviroment", vol. 26, No. 8, Jan. 1984.
IBM Technical Disclosure Bulletin, "Method to Initialize the Error Handling Logic of a Peripheral Component Interconnect System", vol. 37, No. 08, Aug. 1994.
IBM Technical Disclosure Bulletin, "BUS Fault Identification Algorithm", vol. 32, No. 6A, Nov. 1989.

*Primary Examiner*—Peter Wong
*Assistant Examiner*—Tim Vo
(74) *Attorney, Agent, or Firm*—Sawyer Law Group LLP

(57) ABSTRACT

Method and system aspects for check stop error handling are provided. A method aspect for check stop error handling in a computer system, the computer system comprising a plurality of components including a processor that supports an operating system and firmware, includes utilizing a service processor following a check stop error for error data retrieval and attempting a reboot of the computer system. The method further includes initiating firmware for failure reporting based on the error data retrieval when the reboot is successful.

18 Claims, 3 Drawing Sheets

U.S. PATENT DOCUMENTS

| | | | |
|---|---|---|---|
| 5,307,482 A | 4/1994 | Bealkowski et al. | 395/575 |
| 5,313,625 A | 5/1994 | Hess et al. | 395/575 |
| 5,313,628 A | 5/1994 | Mendlesohn et al. | 395/575 |
| 5,317,752 A | 5/1994 | Jewett et al. | 395/750 |
| 5,375,219 A | 12/1994 | Okabe | 395/425 |
| 5,390,324 A | 2/1995 | Burckhartt et al. | 395/575 |
| 5,410,706 A | 4/1995 | Farrand et al. | 395/700 |
| 5,421,006 A | 5/1995 | Jablon et al. | 395/575 |
| 5,437,047 A | 7/1995 | Nakamura | 395/800 |
| 5,442,777 A | 8/1995 | Nakajima et al. | 395/182.18 |
| 5,444,859 A | 8/1995 | Baker et al. | 395/575 |
| 5,450,579 A | 9/1995 | Johnson | 395/650 |
| 5,455,933 A * | 10/1995 | Schieve et al. | 395/183.03 |
| 5,467,449 A | 11/1995 | Gauronski et al. | 395/185.1 |
| 5,471,674 A | 11/1995 | Stewart et al. | 395/650 |
| 5,475,839 A | 12/1995 | Watson et al. | 395/650 |
| 5,487,148 A | 1/1996 | Komori et al. | 395/182.02 |
| 5,488,688 A | 1/1996 | Gonzales et al. | 395/183.1 |
| 5,499,346 A | 3/1996 | Amini et al. | 395/308 |
| 5,530,847 A * | 6/1996 | Schieve et al. | 395/183.13 |
| 5,530,946 A | 6/1996 | Bouvier et al. | 395/182.21 |
| 5,557,547 A | 9/1996 | Phaal | 364/551.01 |
| 5,560,018 A | 9/1996 | Macon, Jr. et al. | 395/733 |
| 5,560,033 A | 9/1996 | Doherty et al. | 395/800 |
| 5,564,054 A | 10/1996 | Bramnick et al. | 395/700 |
| 5,619,644 A | 4/1997 | Crockett et al. | 395/183.21 |
| 5,680,537 A | 10/1997 | Byers et al. | 395/182.03 |
| 5,712,967 A | 1/1998 | Grossman et al. | 395/182.01 |
| 5,742,851 A | 4/1998 | Sekine | 395/183.19 |
| 5,768,496 A | 6/1998 | Lidgett et al. | 395/183.01 |
| 5,768,612 A | 6/1998 | Nelson | 395/800.32 |
| 5,777,549 A | 7/1998 | Arrowsmith et al. | 340/506 |
| 5,784,617 A | 7/1998 | Greenstein et al. | 395/674 |
| 5,790,870 A | 8/1998 | Hausauer et al. | 395/733 |
| 5,805,785 A | 9/1998 | Dias et al. | 395/182.02 |

* cited by examiner

METHOD AND SYSTEM FOR CHECK STOP ERROR HANDLING

CROSS-REFERENCE TO RELATED APPLICATIONS

The present application is related to applications Ser. No. 08/829,088 entitled "A Method and System for Fault Isolation for PCI Bus Errors," filed Mar. 31, 1998; Ser. No. 08/829,018, entitled "Error Collection Coordination for Software-Readable and Non-Software Readable Fault Isolation Registers in a Computer System," filed Mar. 31, 1998; Ser. No. 08/829,016, entitled "Machine Check Handling for Fault Isolation in a Computer System," filed Mar. 31, 1998; Ser. No. 08/829,089, entitled "Method and System for Reboot Recovery," filed Mar. 31, 1998; and Ser. No. 08/829,090, entitled "A Method and System for Surveillance of Computer System Operations," filed Mar. 31, 1998.

FIELD OF THE INVENTION

The present invention relates generally to error handling in computer systems, and more particularly to check stop error handling in such systems.

BACKGROUND OF THE INVENTION

When a hardware fault is detected in a digital computer system, sometimes the fault is so severe or the risk of data corruption so great that detection of the error is designed to cause an immediate halt of further operations. Except for performing a complete system reset, there is no means of recovering from this state, which is typically called a Check Stop state. Because of the severity of the error, it is important to be able to determine the source of the error so that the failing component can be replaced quickly and the system restored to normal operation.

However, since the main processor is stopped in this condition, a separate processing mechanism is needed to capture failure information. The mechanism is usually referred to as a Service Processor, which provides embedded controller operations that remain even when check stop failures occur. Unfortunately, sophisticated processing mechanisms are needed to extract failure information from the failing components when all the normal functional paths are frozen and perform analysis on the information. Including such sophisticated processing mechanisms, however, increase the system's costs.

Further, typical systems contain very large amounts of error data in the form of latch bits. An engineering change to add even a single new latch bit changes the layout of an entire scan string of data and increases the amount of data needing to be extracted. Providing sufficient storage space to hold the increased data further adds to overall system costs.

Accordingly, what is needed is a capable system for check stop error analysis and handling that functions on low-end computer systems, utilizes a basic, low-cost service processor, and requires relatively small storage space.

SUMMARY OF THE INVENTION

These needs are met through the present invention which provides method and system aspects for check stop error handling. A method aspect for check stop error handling in a computer system, the computer system comprising a plurality of components including a processor that supports an operating system and firmware, includes utilizing a service processor following a check stop error for error data retrieval and attempting a reboot of the computer system. The method further includes initiating firmware for failure reporting based on the error data retrieval when the reboot is successful. In another method aspect, the method includes performing error data retrieval from fault isolation registers of the plurality of components using a service processor following a check stop error, and transforming the error data into an abstracted error log via the firmware after a successful reboot.

In a system aspect, a computer system with check stop error handling includes a processing mechanism, the processing mechanism supporting an operating system, and a service processor coupled to the processing mechanism, the service processor performing error data retrieval following a check stop error. The system further includes a firmware mechanism supported by the processing mechanism, the firmware mechanism performing failure reporting based on the error data retrieval.

The present invention successfully achieves check stop error handling without requiring an expensive service processor with a large amount of storage space. Further, only the needed error registers are saved with the actual analysis running in firmware on the main processor. These and other advantages of the aspects of the present invention will be more fully understood in conjunction with the following detailed description and accompanying drawings.

DESCRIPTION OF THE INVENTION

The present invention relates to handling of check stop errors in a computer system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
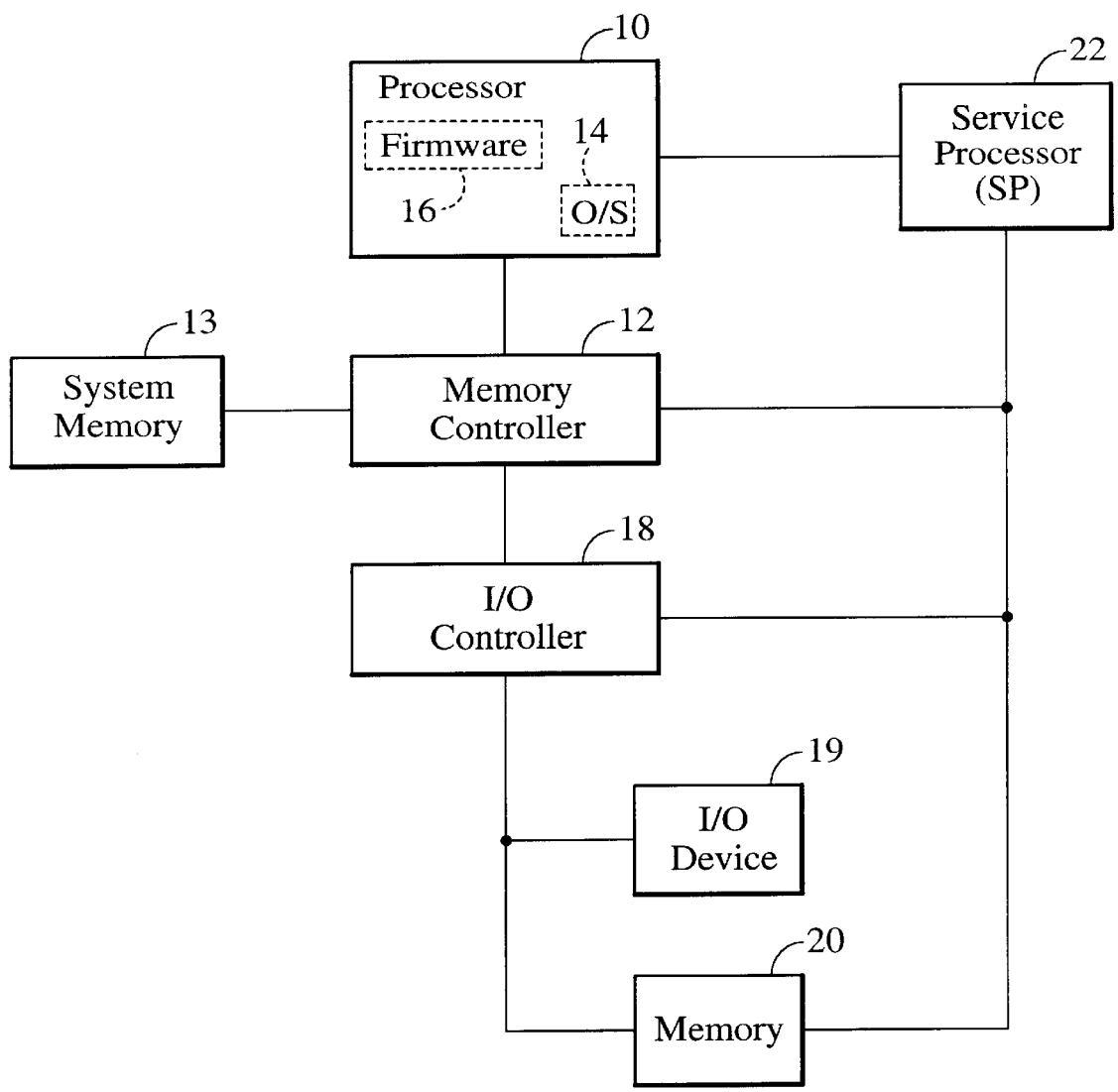
FIG. 1 illustrates a block diagram of a computer system in accordance with the present invention.

FIG. 1 illustrates a basic block diagram of a general purpose computer system for use with the present invention. As shown, the computer system includes a processor 10, such as a PowerPC™ processor from IBM Corporation, of Armonk, N.Y. coupled to memory controller 12, which controls system memory 13, i.e., RAM (random access memory) and ROM (read only memory). An operating system (O/S) 14 typically runs on the processor to perform basic tasks in the computer system and act as a platform for application programs. Also included is firmware 16 that runs on the processor 10 and is code stored in suitable memory, such as non-volatile RAM, or EPROM (erasably programmable read only memory), as is well understood to those skilled in the art.

Further, an input/output (I/O) controller 18 is coupled to the processor 10 for controlling the interactions between the processor 10 and sub-ordinate components, i.e., sub-components, such as input/output devices 19, e.g., a hard disk drive, a monitor, etc., that adhere to an input/output standard, such as a PCI standard, and a memory device 20, such as non-volatile RAM (NVRAM). Further included is an embedded controller, i.e., a service processor (SP) 22. The SP 22 suitably accesses components for failure isolation register data to extract failure information in a scan string. Specific error bits are made more accessible through linking of the bits into a limited series that is directly accessible with a special access command, as defined by IEEE standard 1149.1, often referred to by the name of the originators JTAG (Joint Test Action Group).

In determining failure information, the present invention takes advantage of a PowerPC™ Common Hardware Reference Platform (CHRP) architecture that defines a mechanism for hardware platforms to provide special firmware, called Run-Time Abstraction Services (RTAS), that can be accessed from a running operating system. A description of the features of CHRP may be found in PowerPC™ *Microprocessor Common Hardware Reference Platform: A System Architecture*, published by Morgan Kaufman Publishers, Inc., San Francisco, Calif. 1995. The special firmware has characteristics similar to BIOS in Intel systems. Since the special firmware is tailored to the specific hardware it runs on, it supports storage of extensive knowledge about failure information available in fault isolation registers throughout the various components in the system. The present invention provides a mechanism for performing collection of failure information from fault isolation registers within the computer system following a check stop condition that allows fault identification after a successful system re-boot.

Figure 2:
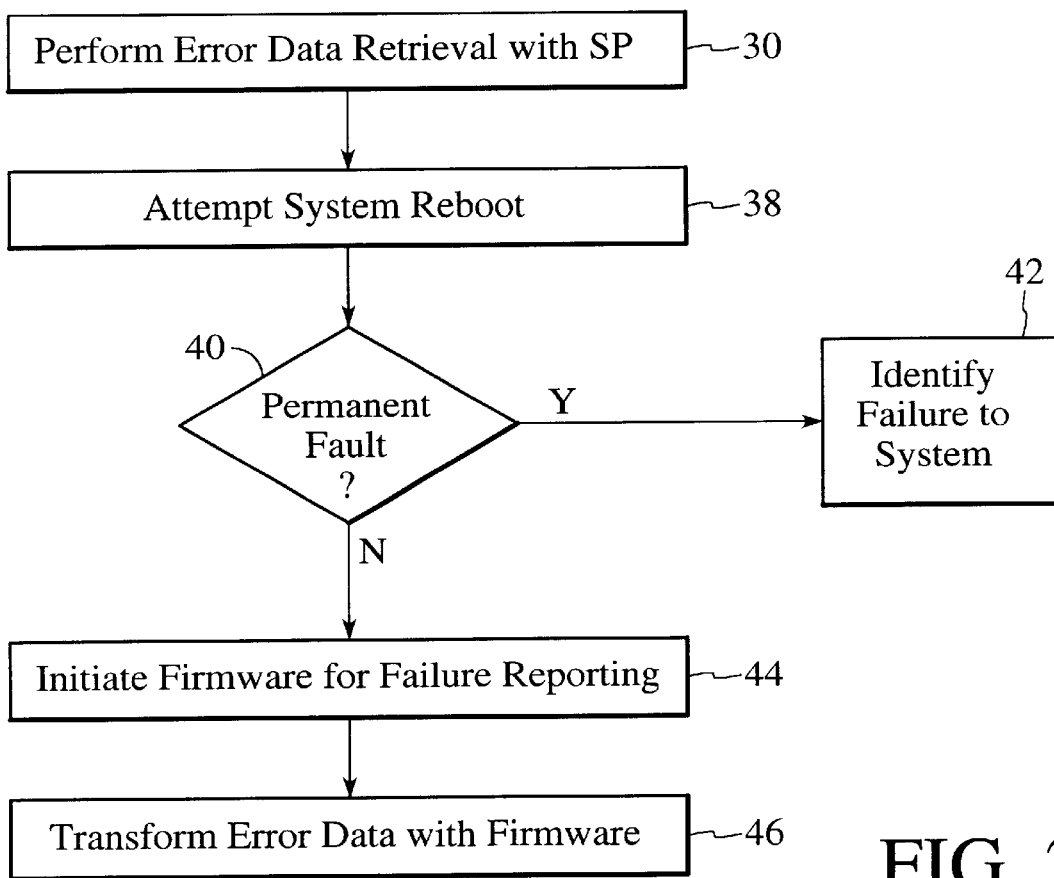
FIG. 2 illustrates a flow diagram of check stop error handling in accordance with the present invention.
Figure 3:
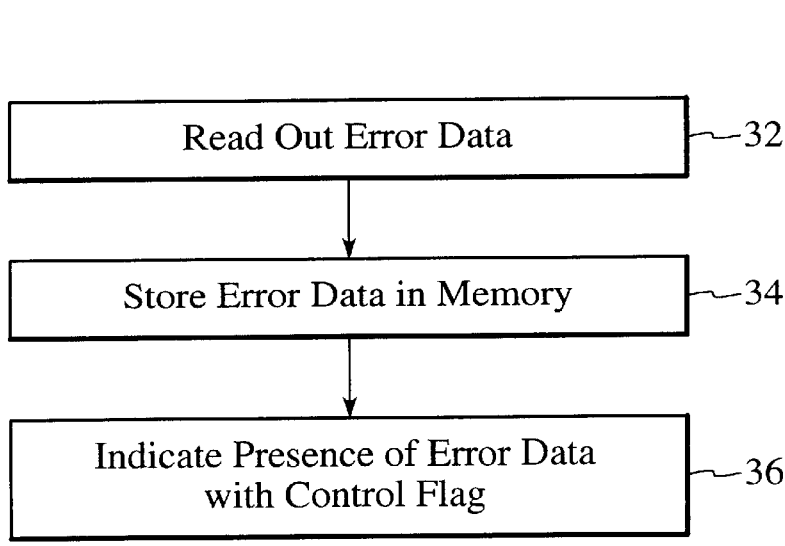
FIG. 3 illustrates a flow diagram detailing a process of utilizing a service processor to perform an error data retrieval step of FIG. 2.

FIG. 2 illustrates a flow diagram of a method for check stop error handling in accordance with the present invention. When a check stop occurs, the process begins by having the SP 22 perform error data retrieval (step 30). Suitably, the SP 22 is signalled to perform the error data retrieval, e.g., the SP 22 receives an attention signal. Referring to FIG. 3, the performance of error data retrieval with the SP 22 suitably includes having the SP 22 read out specific error register data (step 32), e.g., the SP 22 gathers JTAG failure isolation register (FIR) information. The error data is then appropriately placed in a predefined, formatted form in permanent storage, such as memory device/NVRAM 20, by the SP 22 (step 34). The presence of the error data in the storage device 20 is preferably indicated to the system, e.g., by setting a flag/incrementing a control count for check stops, (step 36).

Referring back to FIG. 2, once the SP 22 has finished the error data retrieval, the process continues with an attempt at a system reboot (step 38). Suitably, the system may be rebooted automatically or manually. When the fault condition is a permanent fault, as determined via step 40, and the system is prevented from rebooting, preferably identification of the failure to the system occurs (step 42), e.g., by reporting through normal boot mechanisms, such as a firmware Power-On Self Test (POST) presenting an error code on a console or operator panel. When the fault condition is not a permanent fault, i.e., the failure is intermittent or non-critical and the system successfully reboots, preferably the firmware 16 is called to perform failure reporting (step 44). By way of example, the operating system loads and begins making periodic calls to a resident firmware function (such as the CHRP RTAS "event-scan") that reports platform failures. Once the firmware 16 has been initiated to report on the failure, e.g., upon the first call to event scan, preferably the error data is transformed by the firmware 16 (step 46). Suitably, the firmware 16 reads the stored error register data, creates an abstracted error log in NVRAM 20, and removes the indication of the check stop, e.g., by clearing the flag/check stop count in storage. With the removal of the indication of the check stop by the firmware 16, any subsequent calls to the resident firmware function during normal system operation do not report the check stop failure again. The transforming further includes the firmware 16 returning the abstracted error log to the operating system 14 for identification of failing component(s) within the system.

Figure 4:
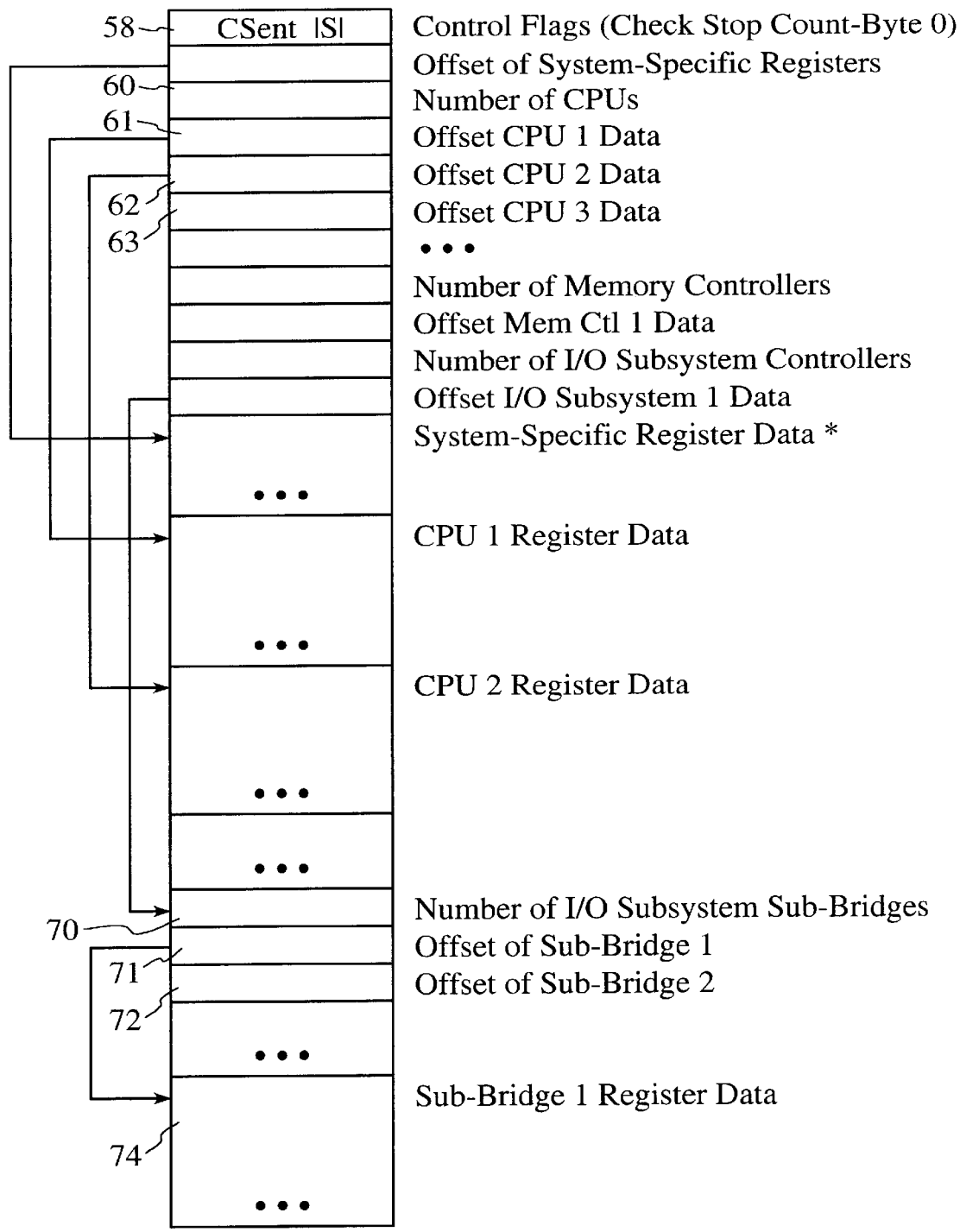
FIG. 4 illustrates a data structure for storing error data in accordance with the present invention.

In saving the data from error registers, preferably the structure of the system is mimicked in the abstracted error log. Suitably, to mimic the structure of the system, the register data is saved in a hierarchical structure from the processor out to the I/O bridges, which provides a distinction between re-used components. By way of example, there may be several I/O Host Bridges, and the data structure preferably reflects which register data came from which bridge. FIG. 4 illustrates a suitable data structure for the abstracted error log storing the error data.

As shown in FIG. 4, in addition to a control flag entry 58, that supports the control flag/check stop count, the error log suitably includes entries, e.g., entries 60-63, that indicate the number of each device type and the offset to the data corresponding to each device. By way of example, the offsets or numbers are provided as two-byte values with the register data depending upon the actual size of the registers and the data from system specific registers, e.g., registers from chips other than basic CPU, memory controller or I/O chips, such as from bus arbitration chips, etc. Thus, specific numbers and bit definitions will vary among platforms.

By way of further example, support for nested I/O subsystems, e.g., remote I/O subsystems, which contain three levels of nested bus bridges, is included, e.g., entries 70, 71, 72, 74. Preferably, the I/O subsystem data areas contain nested numbers and pointers to additional information about sub-bridge instances. Of course, the technique could be applied to other forms of sub-systems, if necessary.

With the abstracted error log of the present invention, check stop error data is provided for analysis in a predetermined format. Further, the present invention overcomes problems associated with past solutions that have provided a fairly large, expensive service processor for the processing power and storage space to do complete check stop error analysis. The present invention also avoids the disadvantages of simpler systems that merely dump full scan string information into a non-volatile RAM area, which then has to be copied by the operating system into a file to be returned to the vendor for engineering analysis. Thus, with the productive use of firmware capabilities in conjunction with a basic service processor, the present invention achieves handling of check stop errors in a cost-efficient and effective manner.

Although the present invention has been described in accordance with the embodiments shown, one of ordinary skill in the art will readily recognize that there could be variations to the embodiments and those variations would be within the spirit and scope of the present invention. For example, the computer system is described in terms of a uniprocessor machine but the aspects of the present invention are equally applicable to a multiprocessor computer system, as well. Accordingly, many modifications may be made by one of ordinary skill in the art without departing from the spirit and scope of the appended claims.

What is claimed is:

1. A method for check stop error handling in a computer system, the computer system comprising a plurality of components including a processor that supports an operating system and firmware, the method comprising:

utilizing a service processor following a check stop error for error data retrieval;

attempting a reboot of the computer system; and initiating firmware for failure reporting based on the error data retrieval when the reboot is successful.

2. The method of claim 1 wherein utilizing a service processor further comprises performing error data retrieval from fault isolation registers of the plurality of components.

3. The method of claim 1 wherein initiating firmware further comprises performing a call to a resident firmware function.

4. The method of claim 1 wherein the method further comprises identifying a failure condition to the system when the attempt to reboot is not successful.

5. The method of claim 2 wherein utilizing a service processor further comprises indicating the presence of error data retrieved to the computer system.

6. The method of claim 2 further comprising transforming the error data into an abstracted error log via the firmware.

7. The method of claim 5 wherein indicating further comprises setting a control flag.

8. The method of claim 6 further comprising analyzing the abstracted error log with the operating system.

9. A computer system with check stop error handling, the computer system comprising:

a processing means, the processing means supporting an operating system;

a service processor coupled to the processing means, the service processor performing error data retrieval following a check stop error; and firmware means supported by the processing means, the firmware means performing failure reporting based on the error data retrieval.

10. The computer system of claim 9 further comprising a plurality of components coupled to the processing means and the service processor, the plurality of components including fault isolation registers from which the service processor retrieves the error data.

11. The computer system of claim 9 wherein the firmware means further transforms the error data into an abstracted error log.

12. The computer system of claim 11 wherein the processing means analyzes the abstracted error log with the operating system.

13. The computer system of claim 11 further comprising memory means coupled to the firmware means and the service processor for storing the abstracted error log.

14. The computer system of claim 13 wherein the memory means further comprises non-volatile random access memory (NVRAM).

15. A method for check stop error handling in a computer system, the computer system comprising a plurality of components including a processor that supports an operating system and firmware, the method comprising:

performing error data retrieval from fault isolation registers of the plurality of components using a service processor following a check stop error; and transforming the error data into an abstracted error log via the firmware after a successful reboot.

16. The method of claim 15 further comprising analyzing the abstracted error log with the operating system.

17. The method of claim 15 further comprising identifying a failure condition in the computer system after an unsuccessful reboot.

18. The method of claim 15 further comprising initiating the firmware through a call to a resident function to instigate the step of transforming.

* * * * *

UNITED STATES PATENT AND TRADEMARK OFFICE
CERTIFICATE OF CORRECTION

PATENT NO. : 6,502,208 B1 Page 1 of 1
DATED : December 31, 2002
INVENTOR(S) : McLaughlin et al.

It is certified that error appears in the above-identified patent and that said Letters Patent is hereby corrected as shown below:

<u>Column 1,</u>
Lines 7-17, should read:
--       The present application is related to applications Ser. No. 08/829,088 entitled "A Method and System for Fault Isolation for PCI Bus Errors," filed March 31, 1997, Ser. No. 08/829,018, entitled "Error Collection Coordination for Software-Readable and Non-Software Readable Fault Isolation Registers in a Computer System," filed March 31, 1997, Ser. No. 08/829,016, entitled "Machine Check Handling for Fault Isolation in a Computer System" filed March 31, 1997; Ser. No. 08/829,089, entitled, "Method and System for Reboot Recovery," filed March 31, 1997; and Ser. No. 08/829,090, entitled "A Method and System for Surveillance of Computer System Operations," filed March 31, 1997. --

Signed and Sealed this

Twelfth Day of August, 2003

JAMES E. ROGAN
*Director of the United States Patent and Trademark Office*